United States Patent
Conrad et al.

(10) Patent No.: US 6,312,588 B1
(45) Date of Patent: Nov. 6, 2001

(54) WATER PURIFIER

(75) Inventors: Wayne Ernest Conrad; Helmut Gerhard Conrad; Ted Szylowiec, all of Hampton; Richard Stanley Phillips, Courtice, all of (CA)

(73) Assignee: Fantom Technologies Inc., Welland (CA)

( * ) Notice: Subject to any disclaimer, the term of this patent is extended or adjusted under 35 U.S.C. 154(b) by 0 days.

(21) Appl. No.: 09/434,500

(22) Filed: Nov. 5, 1999

(30) Foreign Application Priority Data

Nov. 9, 1998 (CA) .................................................. 2253697

(51) Int. Cl.⁷ ............................... B01D 17/12; C02F 1/78
(52) U.S. Cl. ........................ 210/85; 210/86; 210/138; 210/192; 210/257.1; 210/258; 210/259
(58) Field of Search ............................ 210/85, 86, 93, 210/96.1, 103, 104, 109, 110, 138, 139, 143, 192, 257.1, 259, 748, 760, 241, 472, 473, 258, 416.1; 422/24, 186.07

(56) References Cited

U.S. PATENT DOCUMENTS

| | | | |
|---|---|---|---|
| 3,692,180 | * 9/1972 | Larauss | 210/192 |
| 4,412,924 | 11/1983 | Feather | 210/744 |
| 4,599,166 | * 7/1986 | Gesslauer | 210/192 |
| 4,959,142 | 9/1990 | Dempo | 210/167 |
| 5,582,717 | 12/1996 | Di Santo | 210/86 |
| 5,670,094 | 9/1997 | Sasaki et al. | 261/27 |
| 5,683,576 | 11/1997 | Olsen | 210/138 |
| 5,709,799 | 1/1998 | Engelhard | 210/748 |
| 5,711,887 | 1/1998 | Gastman et al. | 210/748 |
| 5,741,416 | 4/1998 | Tempest, Jr. | 210/90 |
| 5,765,403 | 6/1998 | Lincoln et al. | 68/13 R |
| 5,766,488 | 6/1998 | Uban et al. | 210/739 |
| 5,785,866 | 7/1998 | Gehringer et al. | 210/748 |

FOREIGN PATENT DOCUMENTS

1299694 * 12/1989 (JP) ...................................... 210/241

* cited by examiner

Primary Examiner—Joseph W. Drodge
(74) Attorney, Agent, or Firm—Philip C. Mendes da Costa; Bereskin & Parr

(57) ABSTRACT

An apparatus for the purification of water contaminated by micro-organisms and chemicals by means of a three stage process is taught. The apparatus consists of a prefiltration stage, an ozonation stage, and a post filtration stage. The contaminated water is initially drawn from a reservoir through a filter through a bed consisting of a porous media, calcium bentonite, zeolite, activated carbon and a second porous media. The filtered water is then passed into a ozonation chamber wherein gaseous ozone is introduced so as to oxidize contaminants. The reduction/oxidation condition in the ozonation chamber serve to control the cycle time. Once the water is disinfected it is passed through a second filter consisting of a porous media and activated carbon before being dispensed into a clean water carafe.

41 Claims, 1 Drawing Sheet

WATER PURIFIER

FIELD OF THE INVENTION

This invention relates of an apparatus for the production of water fit for human consumption from water contaminated by microorganisms, chemicals, heavy metals and minerals.

BACKGROUND OF THE INVENTION

The production of water fit for human consumption from water contaminated by micro-organisms, chemicals, heavy metals and minerals is a requirement throughout the world. Many different proposals have been made for the purification of contaminated water.

The most popular system in widespread use for the purification of contaminated water is a pitcher wherein contaminated water is passed through a filter made of a combination of a porous media filter, activated carbon, and an ion exchange resin and into a clean water reservoir within the pitcher. This type of system will reduce the levels of chlorine, lead, and pesticides. However, there are several disadvantages associated with this device. The first disadvantage of this water purification system is that the structure of the filter provides a breeding ground for microorganisms thereby multiplying the dangers of microorganisms which may be present in very low numbers. Another disadvantage of such a water purification system is that the filter life is not measured and it is possible for the user to employ the filter beyond its useful life. A further disadvantage of such a water purification system is that oils and fuels often present in water drawn from lakes and rivers are not readily removed and that said oils and fuels tend to coat the filters and damage their operational life and effectiveness. Some filtration based products now incorporate a means of measuring the water volume passing though the filter and an indicator as to when to change the filter. Other filters incorporate an iodine product to minimize the risk of microbiological hazards, however, these materials often impart undesirable tastes and many are potential carcinogens.

Another popular system in use for the purification of contaminated water is a system which employs an ultraviolet light for disinfection in series with a porous media and carbon filter. This type of system will reduce the levels of chlorine, lead, and pesticides and has some disinfection capability. However, there are several disadvantages associated with this device. The first disadvantage of this water purification system is that the ultraviolet light's disinfection efficacy is greatly diminished by turbidity or color in the water which can cause the filter to become contaminated by microorganisms which can readily live and breed therein thereby multiplying the danger from any microorganisms which may be present. Another disadvantage of such a water purification system is that the filter life is not measured and it is possible for the user to employ the filter beyond its useful life. A further disadvantage of such a water purification system is that oils and fuels often present in water drawn from lakes and rivers are not readily removed and that said oils and fuels tend to coat the filters and damage their operational life and effectiveness. Some filtration based products now incorporate a means of measuring the water volume passing though the filter and an indicator as to when to change the filter. Other filters incorporate an iodine product to minimize the risk of microbiological hazards, however, these materials often impart undesirable tastes and many are potential carcinogens.

Clearly therefore, it is desirable that the design of a water purification system will employ a filtration stage prior to ozone, ozone for disinfection and oxidation, and a post ozone filtration stage to remove any residual ozone and products of ozonation from the water before consumption. It is also desirable that the design of a water purification system will employ a means of ensuring, disinfection efficacy. It is also desirable that the design of a water purification system will employ a means of monitoring the filter usage and provide the user with an indication to change the filter.

BRIEF SUMMARY OF THE INVENTION

With the view of satisfying the functional requirements of drinking water purification for use by an individual in a domestic (i.e. residential) environment, the invention comprises a dirty water container into which the user introduces the water to be treated. The water to be treated may be from a municipal water supply which is fed to a house through supply pipes. It may also be water which is obtained from a well maintained by the individual or any other source that the individual has for their house or cottage. The invention further comprises a valve arrangement incorporated into the dirty water container which allows said dirty water container to be separated from the rest of the drinking water purification system so as to facilitate filling without water being spilled. The invention further comprises a pre-ozonation filter which contains a combination of a porous media, calcium bentonite, zeolite, activated carbon and a second porous media. This pre-ozonation filter removes sediment, oils, fats, grease, heavy metals, pesticides and a wide range of chemical and metallic pollutants from the water prior to ozonation. The pre-ozonation filtration stage significantly reduces the amount of ozone required to achieve the desired level of disinfection and oxidation.

The invention further comprises an disinfection and oxidation stage in which ozone gas is introduced into the water. This treatment stage provides for a five to seven log reduction in microorganisms as well as a two to four log reduction in pesticides, herbicides and a wide range of chemical, metallic and mineral pollutants.

The invention further comprises an post-ozonation filter. The post-ozonation filter contains a combination of a porous media, activated carbon and a second porous media. This post-ozonation filter reduces or eliminates any residual ozone, sediment and pollutants flocculated by the ozonation process, and any remaining trace levels, pesticides, herbicides and other chemical pollutants from the water prior to the water being dispensed into a clean water carafe.

This invention further comprises an oxidation/reduction probe in the ozonation chamber to all the disinfection and oxidation process progress to be monitored and provides the feedback employed by the micro-controller to determine the treatment time. The monitoring of the disinfection and oxidation process by the oxidation/reduction probe also provides a means of rejecting water which cannot be effectively purified thereby ensuring the quality level of the water being dispensed from the water treatment device. This invention also incorporates a light which indicates when the water purified is not satisfactory as it cannot achieve the desired oxidation/reduction conditions after a period of time. A further feature of this invention is that treated water which is not satisfactory will not be dispensed from the machine. A provision to manually dump out the bad water is provided and the system will reset when the start switch is depressed only if the unsatisfactory water has been dumped out.

The invention further comprises a counter which tallies the number of operational cycles of the water purification system. As this invention describes a batch system having a fixed volume of contaminated water being purified in each batch, the filter life can be monitored and an indicator light will indicate when the filter must be changed. A further safeguard incorporated into this invention is that after a predetermined number of cycles after the indicator light has signalled the time to change the filter, the system will stop operating until the user replaces the filter and resets the system by means of a reset switch.

The invention further comprises a series of indicator lights which provide the user with information as to when the system has power; when the purification process is in progress; and when the filter must be changed.

In accordance with the instant invention, there is provided a domestic countertop apparatus for treating water on a batch basis comprising:

(a) a pre-filter to filter sediment, oxidizable organic compounds and contaminants from the water to be treated;

(b) an ozone contact chamber positioned downstream from the pre-filter, the ozone contact chamber sized to receive a metered amount of water to be treated;

(c) an ozone supply for supplying ozone to the ozone contact chamber and contacting the water in the ozone contact chamber to treat the water;

(d) a post-filter for filtering residual ozone and contaminants from the treated water;

(e) a treated water storage container positioned downstream from the ozone contact chamber for storing the treated water, the treated water storage container is removable from the apparatus to decant the treated water and is open to the ambient; and, (f) a treated water pump positioned downstream from the ozone contact chamber for transporting water from the ozone contact chamber to the treated water storage container.

In one embodiment, the apparatus is connected to a domestic water supply.

In another embodiment, the apparatus further comprises an untreated water storage container for receiving and storing the water to be treated and an untreated water pump to transport the water to be treated from the untreated water storage container to the ozone contact chamber.

In another embodiment, the untreated water storage container is removable from the apparatus so that it may be filled.

In another embodiment, the apparatus further comprises an ozone generator.

In another embodiment, the apparatus further comprises an ozone destructor.

In another embodiment, the apparatus has a sensor for measuring the quality of the treated water and an exit port for decanting treated water which is not of a preset quality.

In another embodiment, the apparatus further comprises a timer to time the contact time of the water in the ozone contact chamber with the ozone.

In another embodiment, the apparatus further comprises:

(a) a sensor for measuring the quality of the treated water;

(b) a sensor to detect the water level in the ozone contact chamber; and, (c) a controller to
   (i) monitor the water level in the ozone contact chamber and time the contact of the water in the ozone contact chamber with the ozone; and,
   (ii) monitor the level of treatment of water and signal if the treated water is not of a preset quality.

The controller may automatically activate the treated water pump if the treated water is of a preset quality.

In another embodiment, the treated water storage container is removable from the apparatus to decant the treated water.

In another embodiment, the treated water is exposed to the ambient while in the treated water storage container.

In accordance with the instant invention there is provided a domestic apparatus for treating water on a batch basis comprising:

(a) an untreated water storage container for receiving and storing water to be treated;

(b) a first pump positioned downstream from the untreated water storage container for transporting water from the untreated water storage container to the ozone contact chamber;

(c) a pre-filter;

(d) an ozone contact chamber positioned downstream from the pre-filter, the ozone contact chamber sized to receive a metered amount of water to be treated;

(e) an ozone supply for supplying ozone to the ozone contact chamber and contacting the water in the ozone contact chamber to treat the water;

(f) a post-filter for filtering residual ozone and contaminants from the treated water;

(g) a treated water storage container positioned downstream from the ozone contact chamber for storing the treated water; and, (h) a pump positioned downstream from the ozone contact chamber for transporting water from the ozone contact chamber to the treated water storage container.

In accordance with the instant invention, there is provided a domestic apparatus for treating water on a batch basis comprising:

(a) a removable untreated water storage container for receiving and storing water to be treated;

(b) a first pump positioned downstream from the untreated water storage container for transporting water from the untreated water storage container to the ozone contact chamber;

(c) an ozone contact chamber positioned downstream from the pre-filter, the ozone contact chamber sized to receive a metered amount of water to be treated;

(d) an ozone supply for supplying ozone to the ozone contact chamber and contacting the water in the ozone contact chamber to treat the water;

(e) a removable treated water storage container positioned downstream from the ozone contact chamber for storing the treated water; and, (f) a pump positioned downstream from the ozone contact chamber for transporting water from the ozone contact chamber to the treated water storage container.

These first remarks are intended only as a general description of the basic principles of the invention. The various features of novelty which characterize this invention are pointed out more exactly in the claims annexed to and forming part of this disclosure. For a better understanding of the invention and its operation and uses, reference should be made to the accompanying drawing and descriptive matter wherein the preferred embodiment of the invention is described.

BRIEF DESCRIPTION OF THE DRAWINGS

A further, detailed description of the invention, briefly described above, will follow by reference to the following drawing of a preferred embodiment of the invention in which.

DETAILED DESCRIPTION OF THE PREFERRED EMBODIMENT

Figure 1:
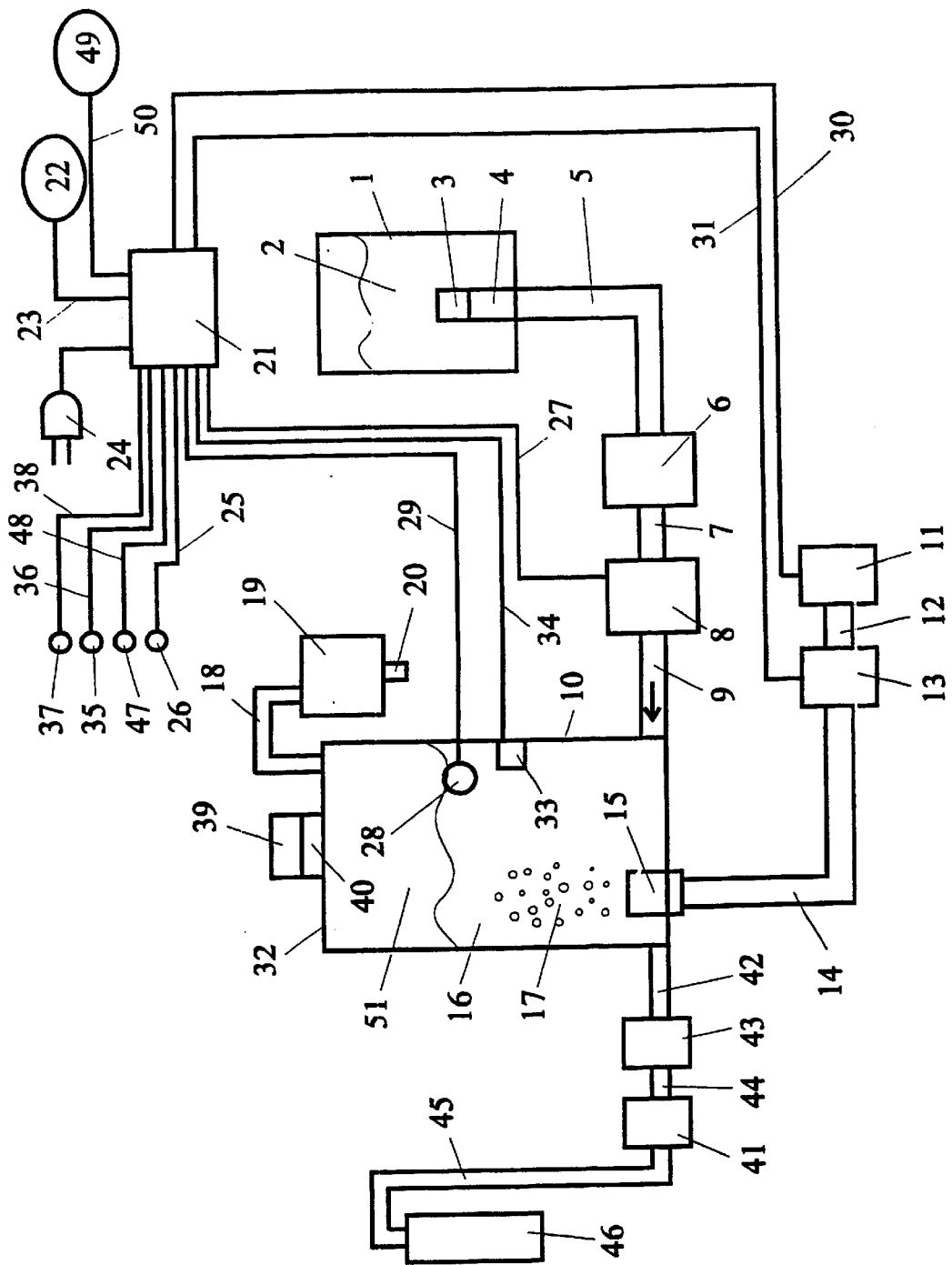
FIG. 1 shows a schematic representation of the apparatus for the purification of water by means of bentonite clay filtration, ozonation, and activated carbon filtration.

Referring to the figure, the apparatus for the production of water fit for human consumption from water contaminated by micro-organisms, chemicals, heavy metals and minerals is described as follows. The preferred embodiment of the invention is shown in FIG. 1. The invention consists of a contaminated water vessel 1 into which contaminated water 2 is placed. The contaminated water vessel 1 incorporates the valve 3 and the connector 4. The connector 4 allows the contaminated water vessel 1 to be separated from the hose 5. The valve 3 and connector 4 are arranged such that when the connector 4 is in communication with hose 5 the valve 3 is open and allows the contaminated water 2 to flow freely into the hose 5. The valve 3 and connector 4 are also arranged such that when the connector 4 is not in communication with hose 5 the valve 3 is closed and the contaminated water 2 cannot flow out of the contaminated water vessel 1. The water treatment cycle is controlled by means of a micro-controller 21. When the system is supplied with power by means of the line cord, the micro-controller 1 provides power to the light 26 by means of wiring 25. Light 26 indicates that the power to the water treatment system is on and that the system is functioning correctly. The start button 22 is connected to the micro-controller 21 by means of wiring 23. The momentary depression of the start button 22 signals the micro-controller 21 to begin the water purification cycle and is considered the beginning of the water treatment cycle. The micro-controller 21 then supplies power to illuminate the light 35 indicating that the water is being treated by means of wiring 36 and to supply power to the water pump 8 by means of wiring 27. The motive force to cause the contaminated water 2 to flow is provided by the water pump 8. The contaminated water 2 flows from the contaminated water vessel 1 through the valve 3 through connector 4 through the hose 5 through the filter 6 through the hose 7 through water pump 8 through a one way check valve means 9 and into the ozone contacting chamber 10. A float switch 28 provides a signal to the micro-controller 21 by means of wiring 29 when the water level reaches the high of the float switch 28. This signal from the float switch 28 causes the micro-controller 21 to disconnect the power from the water pump 8, and to connect power to the air pump 11 by means of wiring 30 and to connect power to the ozone generator 13 by means of wiring 31. The air pump 11 provides the motive force to cause air containing oxygen to flow through hose 12 into the ozone generator 13. The ozone generator 13 converts a portion of the oxygen in the air containing oxygen into ozone. The ozone bearing gas then passes from the ozone generator 13 through the hose 14 and through the sparger 15 which causes the gas to be dispersed into the water 16 as small bubbles 17. The off-gas 51 in the head space 32 of the ozone contacting chamber 10 contains ozone and is forced through hose 18 and through an ozone destructor 19 from which the air is discharged to the room by hose 20. A reduction/oxidation sensor 33 provides a signal to the micro-controller 21 by means of wiring 34. The micro-controller 21 monitors the reduction/oxidation potential and the time for which said oxidation/reduction potential is maintained as the basis for determining when the oxidation/reduction potential has been maintained for a sufficient period to indicate that effective disinfection has occurred. If after a predetermined period of time the required oxidation/reduction conditions have not been achieved, the micro-controller 21 cuts off power to the air pump 11 and the ozone generator 13 and supplies power to illuminate bulb 37 which indicates that the water has not been satisfactorily disinfected and purified by means of wiring 38. The user must then manually remove the cap means 39 from the contact chamber spout 40 and pour the water out for disposal. If the micro-controller receives a signal from the float switch 28 by means of wiring 29 that the water level is no longer filled, the start button will cause the micro-controller to turn off the bulb 37 by means of the wiring 38 and to begin the next water treatment cycle.

If the reduction/oxidation potential condition indicative of effective disinfection is achieved, the micro-controller 21 cuts off power to the air pump 11 and the ozone generator 13 and supplies power to the water pump 43 which serves to provide the motive force to pump the water 16 into the clean water carafe 46. The water 16 from within the ozone contacting chamber 10 is drawn through the hose 42 into the water pump 43 which discharges the water through the hose 44 through the filter 41 and on through the hose 45 and into the clean water carafe 46. The micro-controller 21 cuts off the power to pump 43 after a fixed period of time.

Once a predetermined number of water treatment cycles have occurred, the micro-controller 21 will supply power to light 47 changed by means of the wiring 48 to indicate that the filters 6 and 41 must be replaced. After an addition number of cycles, the micro-controller 21 will cause the light 47 to flash by intermittently supply power to the light 47 by means of the wiring 48 to indicate that the filter life has ended and that no further water processing can occur. The micro-controller will not be activated by a signal from the start button 22 while the light 47 is flashing. The user must replace filters 6 and 41 and press the reset button 49 which will supply a signal to the micro-controller 21 by means of wiring 50 and said signal shall cause the micro-controller to reset the filter cycle count to zero and to resume normal operation.

If the water pump 8 or the water pump 43 or the air pump 11 or the ozone generator 13 fails to draw the correct current when power is applied, the micro-controller 21 will either turn off or flash the power to the light 26 to indicate that a hardware failure has occurred. The micro-controller will not allow the unit to operate in this condition.

In one preferred embodiment, the apparatus is for use in a domestic (i.e. residential) environment, eg. a house, cottage, a mobile home or the like and the water to be treated may be from a municipal water supply which is fed to a house through supply pipes. It may also be water which is obtained from a well maintained by the individual or any other source that the individual has for their house, cottage, a mobile home or the like.

What is claimed is:

1. A domestic countertop apparatus for treating water on a batch basis comprising:
   (a) a pre-filter to filter sediment, oxidizable organic compounds and contaminants from the water to be treated;
   (b) an ozone contact chamber positioned downstream from the pre-filter, the ozone contact chamber receiving water to be treated;
   (c) an ozone supply for supplying ozone to the ozone contact chamber and contacting the water in the ozone contact chamber to treat the water;
   (d) a post-filter for filtering residual ozone and contaminants from the treated water;
   (e) a treated water storage container positioned downstream from the ozone contact chamber for storing the treated water, the treated water storage container being removable from the apparatus to decant the treated water and is open to the ambient;

(f) a treated water pump positioned downstream from the ozone contact chamber for transporting water from the ozone contact chamber to the treated water storage container; and, (g) a sensor for measuring the quality of the treated water and an exit port for disposing of treated water which is not of a preset quality.

2. The apparatus as claimed in claim 1 wherein the apparatus is connectable to a domestic water supply.

3. The apparatus as claimed in claim 1 further comprising an untreated water storage container for receiving and storing the water to be treated and an untreated water pump to transport the water to be treated from the untreated water storage container to the ozone contact chamber.

4. The apparatus as claimed in claim 3 wherein the untreated water storage container is removable from the apparatus so that it may be filled.

5. The apparatus as claimed in claim 1 wherein the ozone supply comprises an ozone generator.

6. The apparatus as claimed in claim 1 further comprising an ozone destructor.

7. The apparatus as claimed in claim 1 further comprising a timer to time the contact time of the water in the ozone contact chamber with the ozone.

8. The apparatus as claimed in claim 1 further comprising:
(a) a sensor to detect the water level in the ozone contact chamber; and,
(b) a controller to
   i. monitor the water level in the ozone contact chamber and time the contact of the water in the ozone contact chamber with the ozone; and,
   ii. monitor the quality of treatment of water and signal if the treated water is not of a preset quality.

9. The apparatus as claimed in claim 8 wherein the controller automatically activates the treated water pump if the treated water is of a preset quality.

10. A domestic apparatus for treating water on a batch basis comprising:
(a) an untreated water storage container for receiving and storing water to be treated;
(b) a first pump positioned downstream from the untreated water storage container for transporting water from the untreated water storage container to an ozone contact chamber;
(c) a pre-filter;
(d) the ozone contact chamber positioned downstream from the pre-filter, the ozone contact chamber receiving water to be treated;
(e) an ozone supply for supplying ozone to the ozone contact chamber and contacting the water in the ozone contact chamber to treat the water;
(f) a post-filter for filtering residual ozone and contaminants from the treated water;
(g) a treated water storage container positioned downstream from the ozone contact chamber for storing the treated water;
(h) a pump positioned downstream from the ozone contact chamber for transporting water from the ozone contact chamber to the treated water storage container; and,
(i) a sensor for measuring the quality of the treated water and an exit port for disposing of treated water which is not of a preset quality.

11. The apparatus as claimed in claim 10 wherein the untreated water storage container is removable from the apparatus so that it may be filled.

12. The apparatus as claimed in claim 10 wherein the ozone supply comprises an ozone generator.

13. The apparatus as claimed in claim 10 further comprising an ozone destructor.

14. The apparatus as claimed in claim 10 further comprising a timer to time the contact time of the water in the ozone contact chamber with the ozone.

15. The apparatus as claimed in claim 10 further comprising:
(a) a sensor to detect the water level in the ozone contact chamber; and,
(b) a controller to
   i. monitor the water level in the ozone contact chamber and time the contact of the water in the ozone contact chamber with the ozone; and,
   ii. monitor the quality of treatment of water and signal if the treated water is not of a preset quality.

16. The apparatus as claimed in claim 15 wherein the controller automatically activates the treated water pump if the treated water is of a preset quality.

17. The apparatus as claimed in claim 10 wherein the treated water storage container is removable from the apparatus to decant the treated water.

18. The apparatus as claimed in claim 10 wherein the treated water is exposed to the ambient while in the treated water storage container.

19. A domestic apparatus for treating water on a batch basis comprising:
(a) a removable untreated water storage container for receiving and storing water to be treated;
(b) a first pump positioned downstream from the untreated water storage container for transporting water from the untreated water storage container to the ozone contact chamber;
(c) an ozone contact chamber positioned downstream from the pre-filter, the ozone contact chamber receiving water to be treated;
(d) an ozone supply for supplying ozone to the ozone contact chamber and contacting the water in the ozone contact chamber to treat the water;
(e) a pump positioned downstream from the ozone contact chamber for transporting water from the ozone contact chamber to the treated water storage container; and,
(f) a sensor for measuring the quality of the treated water and an exit port for disposing of treated water which is not of a preset quality.

20. The apparatus as claimed in claim 19 further comprising a removable treated water storage container positioned downstream from the ozone contact chamber for storing the treated water.

21. The apparatus as claimed in claim 19 wherein the ozone supply comprises an ozone generator.

22. The apparatus as claimed in claim 19 further comprising an ozone destructor.

23. The apparatus as claimed in claim 19 further comprising a timer to time the contact time of the water in the ozone contact chamber with the ozone.

24. The apparatus as claimed in claim 19 further comprising:
(a) a sensor to detect the water level in the ozone contact chamber; and, (b) a controller to
  i. monitor the water level in the ozone contact chamber and time the contact of the water in the ozone contact chamber with the ozone; and,
  ii. monitor the quality of treatment of water and signal if the treated water is not of a preset quality.

25. The apparatus as claimed in claim 24 wherein the controller automatically activates the treated water pump if the treated water is of a preset quality.

26. The apparatus as claimed in claim 19 wherein the treated water is exposed to the ambient while in the treated water storage container.

27. A domestic countertop apparatus for treating water on a batch basis comprising:
  (a) a pre-filter to filter sediment, oxidizable organic compounds and contaminants from the water to be treated;
  (b) an ozone contact chamber positioned downstream from the pre-filter, the ozone contact chamber receiving water to be treated;
  (c) an ozone supply for supplying ozone to the ozone contact chamber and contacting the water in the ozone contact chamber to treat the water;
  (d) a post-filter for filtering residual ozone and contaminants from the treated water;
  (e) a treated water storage container positioned downstream from the ozone contact chamber for storing the treated water, the treated water storage container being removable from the apparatus to decant the treated water and is open to the ambient;
  (f) a treated water pump positioned downstream from the ozone contact chamber for transporting water from the ozone contact chamber to the treated water storage container; and,
  (g) a timer to time the contact time of the water in the ozone contact chamber with the ozone.

28. The apparatus as claimed in claim 27 wherein the apparatus is connectable to a domestic water supply.

29. The apparatus as claimed in claim 27 further comprising an untreated water storage container for receiving and storing the water to be treated and an untreated water pump to transport the water to be treated from the untreated water storage container to the ozone contact chamber.

30. The apparatus as claimed in claim 29 wherein the untreated water storage container is removable from the apparatus so that it may be filled.

31. A domestic countertop apparatus for treating water on a batch basis comprising:
  (a) a pre-filter to filter sediment, oxidizable organic compounds and contaminants from the water to be treated;
  (b) an ozone contact chamber positioned downstream from the pre-filter, the ozone contact chamber receiving water to be treated;
  (c) an ozone supply for supplying ozone to the ozone contact chamber and contacting the water in the ozone contact chamber to treat the water;
  (d) a post-filter for filtering residual ozone and contaminants from the treated water;
  (e) a treated water storage container positioned downstream from the ozone contact chamber for storing the treated water, the treated water storage container being removable from the apparatus to decant the treated water and is open to the ambient;
  (f) a treated water pump positioned downstream from the ozone contact chamber for transporting water from the ozone contact chamber to the treated water storage container;
  (g) a sensor for measuring the quality of the treated water;
  (h) a sensor to detect the water level in the ozone contact chamber; and,
  (i) a controller to
    i. monitor the water level in the ozone contact chamber and time the contact of the water in the ozone contact chamber with the ozone; and,
    ii. monitor the quality of treatment of water and signal if the treated water is not of a preset quality.

32. The apparatus as claimed in claim 31 wherein the controller automatically activates the treated water pump if the treated water is of a preset quality.

33. A domestic apparatus for treating water on a batch basis comprising:
  (a) an untreated water storage container for receiving and storing water to be treated;
  (b) a first pump positioned downstream from the untreated water storage container for transporting water from the untreated water storage container to an ozone contact chamber;
  (c) a pre-filter;
  (d) the ozone contact chamber positioned downstream from the pre-filter, the ozone contact chamber receiving water to be treated;
  (e) an ozone supply for supplying ozone to the ozone contact chamber and contacting the water in the ozone contact chamber to treat the water;
  (f) a post-filter for filtering residual ozone and contaminants from the treated water;
  (g) a treated water storage container positioned downstream from the ozone contact chamber for storing the treated water;
  (h) a pump positioned downstream from the ozone contact chamber for transporting water from the ozone contact chamber to the treated water storage container; and,
  (i) a timer to time the contact time of the water in the ozone contact chamber with the ozone.

34. The apparatus as claimed in claim 33 wherein the untreated water storage container is removable from the apparatus so that it may be filled.

35. The apparatus as claimed in claim 33 further comprising:
  (a) a sensor for measuring the quality of the treated water;
  (b) a sensor to detect the water level in the ozone contact chamber; and,
  (c) a controller to
    i. monitor the water level in the ozone contact chamber and time the contact of the water in the ozone contact chamber with the ozone; and,
    ii. monitor the quality of treatment of water and signal if the treated water is not of a preset quality.

36. A domestic apparatus for treating water on a batch basis comprising:
  (a) an untreated water storage container for receiving and storing water to be treated;
  (b) a first pump positioned downstream from the untreated water storage container for transporting water from the untreated water storage container to an ozone contact chamber;
  (c) a pre-filter;
  (d) the ozone contact chamber positioned downstream from the pre-filter, the ozone contact chamber receiving water to be treated;
  (e) an ozone supply for supplying ozone to the ozone contact chamber and contacting the water in the ozone contact chamber to treat the water;

(f) a post-filter for filtering residual ozone and contaminants from the treated water;

(g) a treated water storage container positioned downstream from the ozone contact chamber for storing the treated water;

(h) a treated water pump positioned downstream from the ozone contact chamber for transporting water from the ozone contact chamber to the treated water storage container;

(i) a sensor for measuring the quality of the treated water;

(j) a sensor to detect the water level in the ozone contact chamber; and, (k) a controller to
  i. monitor the water level in the ozone contact chamber and time the contact of the water in the ozone contact chamber with the ozone; and,
  ii. monitor the quality of treatment of water and signal if the treated water is not of a preset quality.

37. The apparatus as claimed in claim 36 wherein the controller automatically activates the treated water pump if the treated water is of a preset quality.

38. A domestic apparatus for treating water on a batch basis comprising:

(a) a removable untreated water storage container for receiving and storing water to be treated;

(b) a first pump positioned downstream from the untreated water storage container for transporting water from the untreated water storage container to the ozone contact chamber;

(c) an ozone contact chamber positioned downstream from the pre-filter, the ozone contact chamber receiving water to be treated;

(d) an ozone supply for supplying ozone to the ozone contact chamber and contacting the water in the ozone contact chamber to treat the water;

(e) a pump positioned downstream from the ozone contact chamber for transporting water from the ozone contact chamber to the treated water storage container; and, (f) a timer to time the contact time of the water in the ozone contact chamber with the ozone.

39. The apparatus as claimed in claim 38 further comprising a removable treated water storage container positioned downstream from the ozone contact chamber for storing the treated water.

40. A domestic apparatus for treating water on a batch basis comprising:

(a) a removable untreated water storage container for receiving and storing water to be treated;

(b) a first pump positioned downstream from the untreated water storage container for transporting water from the untreated water storage container to the ozone contact chamber;

(c) an ozone contact chamber positioned downstream from the pre-filter, the ozone contact chamber receiving water to be treated;

(d) an ozone supply for supplying ozone to the ozone contact chamber and contacting the water in the ozone contact chamber to treat the water;

(e) a treated water pump positioned downstream from the ozone contact chamber for transporting water from the ozone contact chamber to the treated water storage container;

(f) a sensor for measuring the quality of the treated water;

(g) a sensor to detect the water level in the ozone contact chamber; and, (h) a controller to
  i. monitor the water level in the ozone contact chamber and time the contact of the water in the ozone contact chamber with the ozone; and,
  ii. monitor the quality of treatment of water and signal if the treated water is not of a preset quality.

41. The apparatus as claimed in claim 40 wherein the controller automatically activates the treated water pump if the treated water is of a preset quality.

* * * * *